United States Patent [19]

Sagawa et al.

[11] 3,920,729

[45] Nov. 18, 1975

[54] ISOPROPANOLAMINE ESTERS OF 3-[3,5 DI-T-BUTYL-4-HYDROXYPHENYL]PROPANOIC ACID

[75] Inventors: Seiji Sagawa, Kawachinagano; Hiroyasu Itoi, Ibaragi; Kazuhiko Fujiyoshi, Toyonaka; Kazuyoshi Kagaya, Ibaragi, all of Japan

[73] Assignee: Sumitomo Chemical Company, Ltd., Osaka, Japan

[22] Filed: May 6, 1974

[21] Appl. No.: 467,229

[30] Foreign Application Priority Data
May 29, 1973  Japan............................ 48-60466
May 10, 1973  Japan............................ 48-52260

[52] U.S. Cl. .................. 260/473 S; 44/70; 99/163; 260/45.85
[51] Int. Cl.² ........................................ C07C 69/76
[58] Field of Search .............................. 260/473 S

[56] References Cited
UNITED STATES PATENTS
3,435,065  3/1969  Dexter et al. .................. 260/473 S
3,441,575  4/1969  Dexter et al. .................. 260/473 S FOREIGN PATENTS OR APPLICATIONS
1,001,098  8/1965  United Kingdom ............ 260/473 S
4,222,456  1967    Japan OTHER PUBLICATIONS
Ogata, C. A., 73, 133254u (1970).

Primary Examiner—John F. Terapane
Attorney, Agent, or Firm—Stevens, Davis, Miller & Mosher

[57] ABSTRACT

Esterified isopropanolamines of the formula,

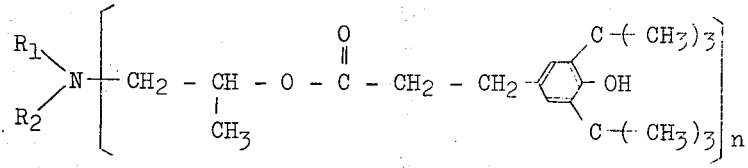

wherein $n$ is an integer of 1 to 3; $R_1$ and $R_2$ are independently hydrogen or alkyl having 1 – 18 carbon atoms provided that when $n$ is 2, $R_2$ is not present and when $n$ is 3, both $R_1$ and $R_2$ are not present, have excellent stabilizing effect on organic substance, especially polyolefins. These esterified isopropanolamines are prepared by reacting an isopropanolamine derivative with β-(3,5-di-tert-butyl-4-hydroxyphenyl)propionic acid or a reactive derivative thereof.

3 Claims, No Drawings

ISOPROPANOLAMINE ESTERS OF 3-[3,5 DI-T-BUTYL-4-HYDROXYPHENYL]PROPANOIC ACID

This invention relates to novel stabilizers for organic substances. More particularly, this invention relates to novel esterified isopropanolamines and a process for preparation thereof, and a stabilization of organic substances, particularly polyolefins.

Various stabilizers for organic substances, especially for polyolefins have been proposed. Polyolefins are widely used in various fields as molded articles, pipes, film, fibers, etc. processed by compression, extrusion, injection, spinning and the like for their excellent physical and chemical properties. But polyolefins such as polyethylene and polypropylene have, as is well known, great defects in that if polyolefins are used alone, they are easily degraded oxidatively by heat or light during the processing and the use of processed articles so that they are decreased in molecular weight and sometimes are colored or stinked, and mechanical strengths of them are decreased remarkably, which make commercial value of them lessen. In order to protect polyolefines from degradation, there are used, for example, 2,6-di-tert-butyl-p-cresol, 4,4′-butylidene-bis-(6-tert-butyl-3-methylphenol), and the like as stabilizer, and 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, n-octadecyl 3-(3,5-di-tert-butyl-4-hydroxyphenyl)propionate, and the like as heat stabilizer. But almost all the known stabilizers are insufficient for practical use in polyolefins in stabilization, compatibility, non-staining property, divergency and the like.

Recently the use of an ester of the formula,

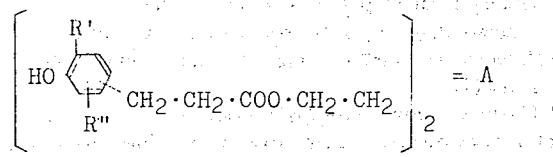

wherein R′ and R″ are independently alkyl having 4–8 carbon atoms; and A is a bivalent substituted N group selected from the group consisting of N-(lower alkyl), N-(substituted lower alkyl), 1,4-piperazinyl and alkaneamide having 2 – 24 carbon atoms, for stabilizing organic substances is disclosed in Japanese Pat. No. 42-22456 (22456/1967). Said ester is prepared from an ethanolamine derivative, but the total yield of the desired compound is low. Further said ester is insufficient in stabilizing effect for organic substances.

It is an object of the present invention to provide novel esterified isopropanolamines having excellent stabilizing effect in organic substances, especially in polyolefins. It is another object of the present invention to provide a process for preparing said esterified isopropanolamines with low cost industrially. It is a further object of the present invention to provide a stabilization of organic substances, especially polyolefin, using said esterified isopropanolamine. Further objects and advantages of the present invention will be apparent to one skilled in the art from the accompanying disclosure and discussion.

The present invention provides a novel compound of the formula,

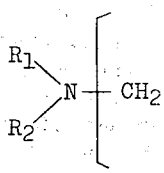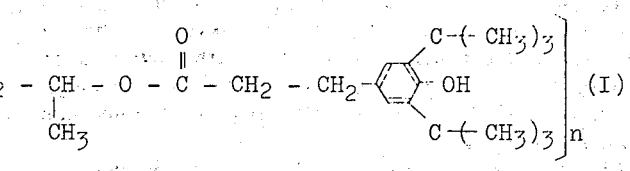 (I)

wherein $n$ is an integer of 1 to 3; and $R_1$ and $R_2$ are independently hydrogen or alkyl having 1 – 18 carbon atoms provided that when $n$ is 2, $R_2$ is not present and when $n$ is 3, both $R_1$ and $R_2$ are not present. Among the compounds of the formula (I), favorable compounds are represented by the formula,

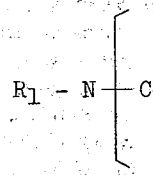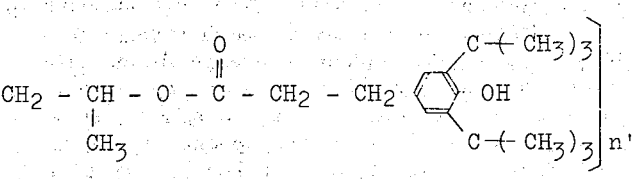

wherein $R_1$ is as defined above, and $n'$ is an integer of 2 or 3, provided that when $n'$ is 3, $R_1$ is not present; and $n'$ is 2, $R_1$ is alkyl having one to 18 carbon atoms, preferably alkyl having six to 18 carbon atoms. The most favorable compound is represented by the formula,

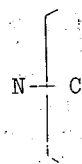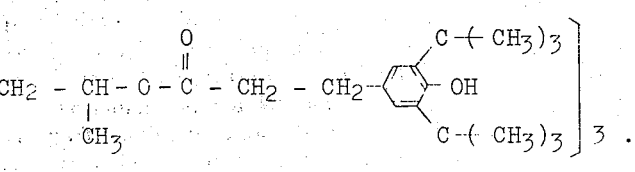

The compound of the formula (I) has a structure similar to that of the ester disclosed in Japanese No. 42-22456 but the former has unexpectedly superior stabilizing effect to the latter. Such excellent property of the compound of the formula (I) is due to the methyl group attached to the β carbon atom with regard to the N atom. Further, due to said methyl group, the compound of the formula (I) is very stable thermally and has no defects such as blooming when mixed with a polyolefin.

The compound of the formula (I) can be prepared by reacting an isopropanolamine of the formula,

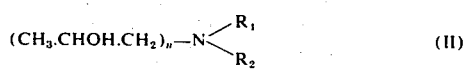

$$(CH_3.CHOH.CH_2)_n-N\begin{matrix}R_1\\R_2\end{matrix} \qquad (II)$$

wherein $R_1$, $R_2$ and $n$ are as defined above, with $\beta$-(3,5-di-tert-butyl-4-hydroxyphenyl)propionic acid or a reactive derivative thereof.

As the isopropanolamine of the formula (II), monoisopropanolamine, diisopropanolamine, triisopropanolamine, N-methyldiisopropanolamine, N-ethyldiisopropanolamine, N-propyldiisopropanolamine, N-butyldiisopropanolamine, N-octyldiisopropanolamine, N-dodecyldiisopropanolamine, N-octadecyldiisopropanolamine, N,N-dimethylmonoisopropanolamine, N,N-dioctylmonoisopropanolamine, N,N-didodecylmonoisopropanolamine, N,N-dioctadecylmonoisopropanolamine and N-methyl-N-octylisopropanolamine may be used preferably. These compounds may be obtained in low price.

As the reactive drivative of $\beta$-(3,5-di-tert-butyl-4-hydroxyphenyl)propionic acid, an alkyl ester thereof wherein the alkyl moiety has 1 – 8 carbon atoms such as methyl, ethyl, propyl, hexyl, isopropyl, tertiary butyl, octyl, an acid halide thereof or an acid anhydride thereof may be used.

The reaction may be carried out in the absence of a solvent or in the presence of an organic solvent such as benzene, toluene, xylene, methyl isobutyl ketone, dimethylformamide, or the like depending on the viscosity or slurry state of a mixture of the reactants. If necessary, a catalyst or a tertiary amine may be used in the reaction. Further the reaction may be carried out under an atmosphere of an inert gas such as nitrogen effectively, if necessary.

As the catalyst, conventional ones such as alkali metal alkoxides, caustic alkalis, alkali metals, alkali metal amides, hydrides of alkali metal or alkaline earth metal, hydrogenated alkali metal aluminum, aluminum borohydride, mineral acids such as sulfuric acid and hydrochloric acid, aromatic sulfonic acids such as paratoluenesulfonic acid may be used. The amount of the catalyst used may be 0.01 – 10% by weight, preferably 0.1 – 5.0% by weight, based on the total weight of the admixed reactans.

A tertiary amine may be mainly used as a removing agent for hydrogen halide if an acid halide is used as a starting material. An equivalent weight or more of the tertiary amine to the acid halide may be used. Examples of the tertiary amine or trimethylamine, triethylamine, pyridine, N,N-dimethylaniline, and the like.

In order to proceed the reaction favorably, it is preferable to remove a by-product such as water in the case of an acid, a corresponding alkanol in the case of an ester and a hydrogen halide in the case of an acid halide being used as a starting propionic acid derivative.

$\beta$-(3,5-Di-tert-butyl-4-hydroxyphenyl)propionic acid or a reactive derivative thereof equivalent to the number of the hydroxyl group in an isopropanolamine of the formula (II) or in slightly excess may be used per equivalent weight of the isopropanolamine.

The reaction may be carried out at a temperature of from 0° to 360°C, preferably from 0° to 220°C under an atmospheric pressure or less.

After the completion of the reaction, the reaction product is neutralized or filtered off, treated and purified using a conventional process to give the desired compound.

The compound of the formula (I) can be used effectively for stabilizing organic substances, such as polyolefins, halogenated vinyl polymers, copolymers of halogenated vinyl and unsaturated polymerizable compound, copolymers of acrylonitrile, butadiene and styrene, polyurethane, polyamides, polyesters, polyacetals, polycarbonates, polystyrene and natural and synthetic rubber. The compound of the present invention can also be applied for stabilizing lubricants, animal and vegetable oils, fat and oil, gasoline, mineral oil, fuels and alkylene glycols.

Examples of polyolefins are homopolymers or copolymers of ethylene, propylene, butene-1, isobutene, pentene-1, 4-methylpentene-1, and the like, or so-called petroleum resins obtained by polymerizing $C_4$ or more cuts from petroleum cracking products.

The amount of the compound of the formula (I) to be added to the organic substance is 0.001 – 5 parts by weight, preferably 0.05 – 1 part by weight per 100 parts by weight of the organic substance. When the compound of the formula (I) is added in an amount of less than 0.001 part by weight to the organic substance, the stabilizing effect is hardly expected, and almost no increased effect is expected when more than 5 parts by weight of the compound of the formula (I) is added to the organic substance.

Any compounding methods may be employed to obtain a uniform composition of the organic substance and the compound of the formula (I). For example, the desired composition may be prepared by dissolving the compound of the formula (I) in a solvent, having a low boiling point, adding the organic substance to the resulting mixture and then removing the solvent by vaporization, or by mixing the organic substance with the compound of the formula (I) in an extruder.

The compound of the formula (I) may be used together with other antioxidants, ultraviolet radiation absorbers, pigments, dispersing agents, plasticizers, fillers and the like additives.

When the compound of the formula (I) is used together with a thiodialkane acid ester of the formula,

$$S\begin{matrix}C_mH_{2m}COOR_3\\C_mH_{2m}COOR_4\end{matrix} \qquad (III)$$

wherein $m$ is an integer of 1 to 6; $R_3$ and $R_4$ are independently a hydrocarbon radical having 4 – 20 carbon atoms, for stabilizing a polyolefin, more remarkably stabilized polyolefin composition can be obtained by synergistic effect. Examples of the compound of the formula (III) are dilaurylthio dipropionate, distearylthio dipropionate, dimyristylthio dipropionate, etc. The thiodialkane acid ester is disclosed in Japanese Pat. No. 42-22287 (22287/1967) as a stabilizer for stabilizing polypropylene. The ester of the formula (III) can be used in one-fifth to five times, preferably one-third to three times, by weight the compound of the formula (I).

This invention will be explained in more detail with reference to the following examples, which are only illustrative, but not limitative for the scope of the invention.

EXAMPLE 1

To a reactor, 64 g of methyl β-(3,5-di-tert-butyl-4-hydroxyphenyl)propionate, 12.8 g of triisopropanolamine and 0.5 g of sodium methylate were charged simultaneously and heated at 135° – 170°C for 8 hours with stirring in a stream of nitrogen. The evolved methanol was removed from the reactor. After cooling to room temperature, the reaction mixture was dissolved in benzene and washed with water three times to remove the sodium methylate used as catalyst. After removing the benzene by distillation, the residue was distilled at 140°C/1 mm Hg to yield 58 g of N,N,N-tris-[β-(3,5-di-tert-butyl-4-hydroxyphenyl)propionyl] triisopropanolamine. Recrystallized from benzene-hexane system solvent, there were obtained white crystals having a melting point of 147° – 150°C.

| Elementary analysis: | C (%) | H (%) | N (%) |
|---|---|---|---|
| Calculated for $C_{60}H_{93}O_9N$: | 74.15 | 9.58 | 1.44 |
| Found: | 73.90 | 9.74 | 1.45 |

EXAMPLE 2

To a solution of 24.5 g of N-octyldiisopropanolamine in 20 g of triethylamine and 100 g of benzene, 64 g of β-(3,5-di-tert-butyl-4-hydroxyphenyl)propionic acid chloride in 80 ml of benzene was added dropwise at 0° – 5°C with stirring for 1 hour. The resulting mixture was stirred at 80° – 85°C for 4 hours. After completion of the reaction, the reaction mixture was cooled to room temperature and the precipitate was filtered off. The resulting benzene solution was washed with water and the benzene was removed by distillation to yield 52 g of N-octyl-N,N-bis[β-(3,5-di-tert-butyl-4-hydroxyphenyl)-propionyl] diisopropanolamine.

| Elementary analysis: | C (%) | H (%) | N (%) |
|---|---|---|---|
| Calculated for $C_{48}H_{79}O_6N$: | 75.10 | 10.56 | 1.83 |
| Found: | 75.01 | 10.66 | 1.95 |

EXAMPLES 3 – 8

Various compounds within the formula (I) were obtained using starting materials as listed in Table 1 under the reaction conditions as listed in Table 1. The results obtained were shown in Table 1.

Table 1

| Example No. | Starting materials $Y_1 - X$ (g) | Starting materials $(Y_2)_n N{<}^{R_1}_{R_2}$ (g) | Product $(Y_3)_n N{<}^{R_1}_{R_2}$ | Reaction temp. (°C) | Reaction time (hrs.) | Solvent (ml) |
|---|---|---|---|---|---|---|
| 3 | $Y_1$—Cl (64 g) | $(Y_2)_2N$—$C_{12}H_{25}$ (27 g) | $(Y_3)_2N$—$C_{12}H_{25}$ | 20 – 30 ↓ 80 – 90 | 6.0 | Benzene (200 ml) |
| 4 | $Y_1$—$OC_2H_5$ (45 g) | $(Y_2)_2$ NH (10 g) | $(Y_3)_2$ NH | 100 – 120 | 12.0 | — |
| 5 | $Y_1$—Cl (64 g) | $(Y_2)_2$ N—$C_{18}H_{37}$ (33 g) | $(Y_3)_2$ N—$C_{18}H_{37}$ | 20 – 30 ↓ 80 – 90 | 6.0 | Toluene (200 ml) |
| 6 | $Y_1$—$OCH_3$ (41 g) | $(Y_2)N{<}^{CH_3}_{CH_3}$ (9 g) | $(Y_3)N{<}^{CH_3}_{CH_3}$ | 30 – 40 (60–40 mmHg) | 8.0 | Dimethylfolmamide (50 ml) |
| 7 | $Y_1$—$OCH_3$ (41 g) | $(Y_2)N{<}^{C_8H_{17}}_{C_8H_{17}}$ (29 g) | $(Y_3)N{<}^{C_8H_{17}}_{C_8H_{17}}$ | 140 – 150 | 12.0 | — |
| 8 | $(Y_1$—OH) (27 g) | $(Y_2)_2N$—$CH_3$ (12 g) | $(Y_3)_2N$—$CH_3$ | 110 – 115 | 10.0 | Toluene (150 ml) |

| Catalyst (g) | Yield (%) | State of product | Elementary analysis | C % | H % | N |
|---|---|---|---|---|---|---|
| $K_2CO_3$ (1.2 g) | 84 | Colorless viscous liquid | $C_{52}H_{87}O_6N$ Calcd. Found | 76.00 76.05 | 10.60 10.67 | 1.71 1.80 |
| LiH (0.6 g) | 87 | White powder m.p. 52 – 54°C | $C_{40}H_{63}O_6N$ Calcd. Found | 73.50 72.93 | 9.65 10.04 | 2.14 2.35 |
| Triethylamine (50 g) | 71 | White wax-like solid m.p. 31 – 33°C | $C_{58}H_{99}O_6N$ Calcd. Found | 76.91 76.68 | 10.94 10.82 | 1.55 1.51 |
| $C_2H_5OK$ (0.8 g) | 82 | White crystals m.p. 99 – 101°C | $C_{22}H_{68}O_3N$ Calcd. Found | 67.01 67.44 | 17.26 17.01 | 3.55 3.82 |
| $CH_3ONa$ (0.8 g) | 68 | Colorless viscous liquid | $C_{36}H_{96}O_3N$ Calcd. Found | 73.22 72.18 | 16.27 15.89 | 2.37 2.41 |
| p-Toluene-sulfonic acid (1.5 g) | 75 | White crystals m.p. 120 – 123°C | $C_{41}H_{65}O_6N$ Calcd. Found | 73.76 73.52 | 9.75 9.63 | 2.10 2.18 |

Note) $Y_1$:

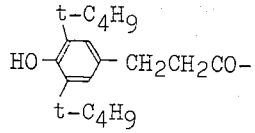

$Y_2$: 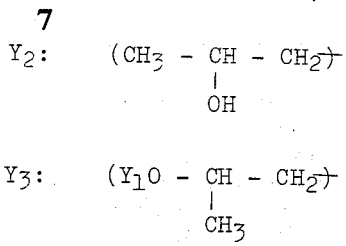

$Y_3$: $(Y_1O-CH(CH_3)-CH_2)$

EXAMPLES 9 – 15, COMPARATIVE EXAMPLES 1 – 12

Resin compositions comprising 100 parts of polypropylene powder and 0.5 parts of stabilizers as listed in Table 2 were prepared by dissolving a stabilizer in acetone, suspending polypropylene powder in the solvent, and removing the acetone. The resulting resin compositions were heated at 210°C for 4 minutes and during the last 1 minute a pressure of 160 kg/cm² was applied thereon to obtain sheet 1.0 mm in thickness. From each sheet, about 2 g of sample was taken. Each sample was placed on a watch glass and allowed to stand in an air circulation thermostat controlled at 150°C to examine the brittleness and weight loss of the sample due to thermally oxidative degradation.

The results obtained were as shown in Table 3.

Table 2 (List of stabilizers)

(Compounds of the formula (I))

A  N,N,N-Tris-[β-(3,5-di-tert-butyl-4-hydroxyphenyl)propionyl] triisopropanolamine
B  N-Octyl-N,N-bis-[β-(3,5-tert-butyl-4-hydroxyphenyl)propionyl] diisopropanolamine
C  N-Lauryl-N,N-bis-[β-(3,5-di-tert-butyl-4-hydroxyphenyl)propionyl] diisopropanolamine
D  N-Stearyl-N,N-bis-[β-(3,5-di-tert-butyl-4-hydroxyphenyl)propionyl] diisopropanolamine
E  N-Methyl-N,N-bis-[β-(3,5-di-tert-butyl-4-hydroxyphenyl)propionyl] diisopropanolamine
F  N-Butyl-N,N-bis-[β-(3,5-di-tert-butyl-4-hydroxyphenyl)propionyl] diisopropanolamine
G  N,N-Dioctyl-N-[β(3,5-di-tert-butyl-4-hydroxyphenyl)propionyl]monoisopropanolamine Known compounds H  N,N,N-tris-[β-(3,5-di-tert-butyl-4-hydroxyphenyl)propionyl] triethanolamine
I  N-Butyl-N,N-bis-[β(3,5-di-tert-butyl-4-hydroxyphenyl)propionyl] diethanolamine
J  N-Lauryl-N,N-bis-[β-(3,5-di-tert-butyl-4-hydroxyphenyl)propionyl] diethanolamine
K  N-Methyl-N,N-bis-[β-(3,5-di-tert-butyl-4-hydroxyphenyl)propionyl] diethanolamine
L  2,6-Di-tert-butyl-p-cresol
M  4,4'-Butylidene-bis-(6-tert-butyl-3-methylphenol)
N  1,3,5-Trimethyl-2,4,6-tris-(3,5-di-tert-butyl-4-hydroxybenzyl)benzene
O  n-Octadecyl-3-(3,5-di-tert-butyl-4-hydroxyphenyl)propionate
P  Tetrakis[methylene-(3,5-di-tert-butyl-4-hydroxyphenyl)cinnamate] methane
Q  4,4'-Thiobis-(6-tert-butyl-3-methylphenol)
R  1,1,3-Tris(2-methyl-4-hydroxy-5-tert-butylphenyl)butane Table 3

| No. | | Stabilizer | | Days required to brittleness | Days required for retaining weight *1 |
|---|---|---|---|---|---|
| | | Kind | Part | | |
| Example | 9 | A | 0.5 | 72 | 76 |
| | 10 | B | 0.5 | 62 | 69 |
| | 11 | C | 0.5 | 68 | 71 |
| | 12 | D | 0.5 | 64 | 72 |
| | 13 | E | 0.5 | 52 | 60 |
| | 14 | F | 0.5 | 54 | 62 |
| | 15 | G | 0.5 | 54 | 64 |
| Comparative Example | 1 | H | 0.5 | 45 | 50 |
| | 2 | I | 0.5 | 25 | 30 |
| | 3 | J | 0.5 | 48 | 52 |
| | 4 | K | 0.5 | 25 | 28 |
| | 5 | L | 0.5 | >1 | >1 |
| | 6 | M | 0.5 | 4 | 4 |
| | 7 | N | 0.5 | 33 | 35 |
| | 8 | O | 0.5 | 42 | 45 |
| | 9 | P | 0.5 | 45 | 50 |
| | 10 | Q | 0.5 | 7 | 10 |
| | 11 | R | 0.5 | 21 | 24 |
| | 12 | None | | >1 | >1 |

Note)
*1: Days required for retaining 95% of the original weight.

EXAMPLES 16 – 22, COMPARATIVE EXAMPLES 13 – 22

Using a procedure similar to that described in Example 9, resin compositions containing 100 parts of polypropylene and stabilizers as listed in Table 4 were prepared. Synergistic stabilizing effects of a combined stabilizers were examined using the same method that described in Example 9. The results obtained were as shown in Table 4.

Table 4

| No. | | Stabilizers | | | | Days required to brittleness | Days required for retaining weight |
|---|---|---|---|---|---|---|---|
| | | Kind | Part | Kind | Part | | |
| Example | 16 | A | 0.25 | S | 0.25 | 74 | 78 |
| | 17 | B | 0.25 | S | 0.25 | 65 | 75 |
| | 18 | C | 0.25 | S | 0.25 | 70 | 78 |
| | 19 | D | 0.25 | S | 0.25 | 68 | 78 |
| | 20 | E | 0.25 | S | 0.25 | 60 | 68 |
| | 21 | F | 0.25 | S | 0.25 | 62 | 68 |
| | 22 | G | 0.25 | S | 0.25 | 62 | 70 |
| Comparative Example | 13 | H | 0.25 | S | 0.25 | 48 | 55 |
| | 14 | I | 0.25 | S | 0.25 | 30 | 38 |
| | 15 | J | 0.25 | S | 0.25 | 52 | 56 |
| | 16 | K | 0.25 | S | 0.25 | 30 | 35 |
| | 17 | L | 0.25 | S | 0.25 | 4 | 5 |
| | 18 | M | 0.25 | S | 0.25 | 8 | 10 |
| | 19 | N | 0.25 | S | 0.25 | 40 | 44 |
| | 20 | O | 0.25 | S | 0.25 | 46 | 52 |
| | 21 | P | 0.25 | S | 0.25 | 50 | 55 |
| | 22 | None | | | | >1 | >1 |

Note)
S is distearylthio dipropionate.

EXAMPLES 23 – 29, COMPARATIVE EXAMPLES 23 – 34

According to the manner similar to that of Examples 9 – 15, resin compositions were prepared to examine the stability, provided that 100 parts of unstabilized high density polyethylene powder was used in place of the propylene, and the compositions were heated at 160°C for 5 minutes and during the last 1 minute a pressure of 100 kg/cm² was applied to obtain each sheet 0.5 mm in thickness. Each sheet was allowed to stand in an air circulation thermostat controlled at 120°C to measure a content of carbonyl group generated due to the thermally oxidative degradation by means of an infrared absorption spectrum measuring apparatus. The time when the first remarkable increase of carbonyl group (1,200 to 2,000 cm$^{-1}$) was observed is expressed in terms of time of carbonyl group. The results are as shown in Table 5.

Table 5

| No. | | Stabilizer Kind | Part | Time of carbonyl group (hrs.) |
|---|---|---|---|---|
| Example | 23 | A | 0.2 | 2,100 |
| | 24 | B | 0.2 | 1,900 |
| | 25 | C | 0.2 | 2,000 |
| | 26 | D | 0.2 | 2,000 |
| | 27 | E | 0.2 | 1,800 |
| | 28 | F | 0.2 | 1,900 |
| | 29 | G | 0.2 | 1,900 |
| Comparative Example | 23 | H | 0.2 | 1,200 |
| | 24 | I | 0.2 | 700 |
| | 25 | J | 0.2 | 1,300 |
| | 26 | K | 0.2 | 800 |
| | 27 | L | 0.2 | 100 |
| | 28 | M | 0.2 | 200 |
| | 29 | N | 0.2 | 900 |
| | 30 | O | 0.2 | 1,000 |
| | 31 | P | 0.2 | 1,100 |
| | 32 | Q | 0.2 | 300 |
| | 33 | R | 0.2 | 700 |
| | 34 | Blank | | 40 |

EXAMPLES 30 – 33, COMPARATIVE EXAMPLES 35 – 40

A mixture of 100 parts of polyvinyl chloride, 1.0 part of lead stearate, 0.5 part of barium stearate, 0.5 part of cadmium stearate and 0.1 part of a stabilizer was mixed in a roll at 170°C for 5 minutes, and pressed at 180°C for 5 minutes under 100 kg/cm² to obtain sheet 1.0 mm in thickness. The coloration of the sheet was examined at 175°C using Gear's oven instrument. The results are as shown in Table 6.

Table 6

| | No. | Stabilizer | 20 min. | 40 min. | 80 min. |
|---|---|---|---|---|---|
| Example | 30 | A | colorless | colorless | colorless |
| | 31 | B | colorless | colorless | slightly pale yellow |
| | 32 | C | colorless | colorless | slightly pale yellow |
| | 33 | F | colorless | colorless | slightly pale yellow |
| Comparative Example | 35 | H | colorless | colorless | yellow |
| | 36 | K | colorless | colorless | yellow |
| | 37 | L | pale yellow | yellow | brown |
| | 38 | N | pale yellow | pale yellow | yellow |
| | 39 | P | colorless | colorless | pale yellow |
| | 40 | Blank | pale yellow | brown | black |

EXAMPLES 34 – 37, COMPARATIVE EXAMPLES 41 – 46

A mixture of 100 parts of acrylonitrile-butadiene-styrene copolymer (ABS resin) and 0.3 part of a stabilizer was pressed at 180°C for 10 minutes under 160 kg/cm² to obtain sheet 1.0 mm in thickness.

The coloration of the sheet was examined at 200°C using Gear's oven instrument. The results are as shown in Table 7.

Table 7

| | No. | Stabilizer | 30 min. | 60 min. | 120 min. |
|---|---|---|---|---|---|
| Example | 34 | A | ⊚ | ⊚ | O |
| | 35 | B | ⊚ | ⊚ | O |
| | 36 | C | ⊚ | ⊚ | O |
| | 37 | F | ⊚ | O | O |
| Comparative Example | 41 | H | ⊚ | O | X |
| | 42 | I | O | O | X |
| | 43 | L | O | X | X X |
| | 44 | M | O | O | X |
| | 45 | P | ⊚ | ⊚ | X |
| | 46 | Blank | X | X X | X X |

Note:
⊚ colorless
O slightly colored
X colored
X X markedly colored

EXAMPLES 38 – 44

To 100 parts of deodorized soy bean oil, 0.05 part of the present stabilizer was added to examine the oxidation stability. Each 20 ml of the soy bean oil taken in a test tube was placed in a thermostat, and was allowed to be bubbled with clear air at 12.5 cm³/min. With the lapse of time, a value of hydroperoxide was measured using the active oxygen method. The results are as shown in Table 8.

Table 8

| Example No. | Stabilizer | Time (hr) | | |
|---|---|---|---|---|
| | | 0 mmol/kg | 5 mmol/kg | 10 mmol/kg |
| 38 | A | 0.1 | 6.3 | 11.4 |
| 39 | B | 0.1 | 7.0 | 12.3 |
| 40 | C | 0.1 | 7.4 | 12.4 |
| 41 | D | 0.1 | 7.6 | 12.6 |
| 42 | E | 0.1 | 8.0 | 13.4 |
| 43 | F | 0.1 | 8.2 | 13.8 |
| 44 | G | 0.1 | 8.4 | 14.0 |
| | Blank | 0.1 | 34.0 | 150.4 |

What is claimed is:

1. A compound of the formula,

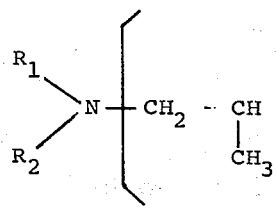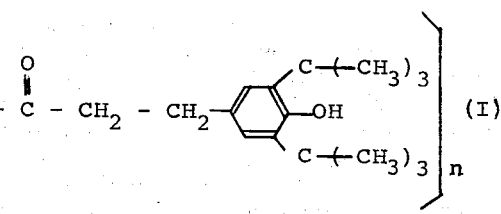

wherein $n$ is an integer of 1 to 3; $R_1$ is hydrogen or alkyl having one to 18 carbon atoms and $R_2$ is alkyl having one to 18 carbon atoms provided that when $n$ is 2, $R_2$ is not present and when $n$ is 3, both $R_1$ and $R_2$ are not present.

2. The compound according to claim 1, wherein $n$ is an integer of 2, and $R_1$ is alkyl having one to 18 carbon atoms.

3. A compound of the formula,

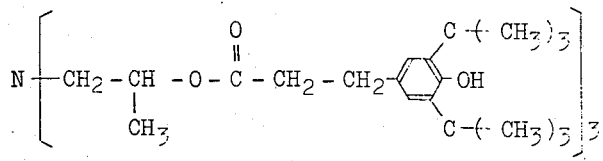

* * * * *